United States Patent
Ettefaghi et al.

(10) Patent No.: US 10,738,253 B2
(45) Date of Patent: Aug. 11, 2020

(54) BIO-NANO EMULSION FUEL

(71) Applicants: Ehsanollah Ettefaghi, Tehran (IR); Alimorad Rashidi, Tehran (IR); Barat Ghobadian, Tehran (IR); Gholamhasan Najafi, Karaj (IR); Mohammad Hadi Khoshtaghaza, Tehran (IR); Sepideh Pourhashem, Karaj (IR); Aliasghar Khalili, Tehran (IR); Zeinab Hajjar, Tehran (IR)

(72) Inventors: Ehsanollah Ettefaghi, Tehran (IR); Alimorad Rashidi, Tehran (IR); Barat Ghobadian, Tehran (IR); Gholamhasan Najafi, Karaj (IR); Mohammad Hadi Khoshtaghaza, Tehran (IR); Sepideh Pourhashem, Karaj (IR); Aliasghar Khalili, Tehran (IR); Zeinab Hajjar, Tehran (IR)

(73) Assignee: Tarbiat Modares University

(*) Notice: Subject to any disclaimer, the term of this patent is extended or adjusted under 35 U.S.C. 154(b) by 48 days.

(21) Appl. No.: 15/992,247

(22) Filed: May 30, 2018

(65) Prior Publication Data
US 2018/0273862 A1    Sep. 27, 2018

Related U.S. Application Data

(60) Provisional application No. 62/516,116, filed on Jun. 7, 2017.

(51) Int. Cl.
*C10L 1/32*   (2006.01)
*C10L 1/12*   (2006.01)
(Continued)

(52) U.S. Cl.
CPC .............. *C10L 1/328* (2013.01); *C01B 32/15* (2017.08); *C01B 32/168* (2017.08);
(Continued)

(58) Field of Classification Search
CPC .... C10L 1/328; C10L 1/32; C10L 1/12; C10L 10/18; C10L 1/324; C10L 1/1208;
(Continued)

(56) References Cited

U.S. PATENT DOCUMENTS

| | | | |
|---|---|---|---|
| 9,550,160 B2 * | 1/2017 | Winter | B01J 13/04 |
| 2010/0199547 A1 * | 8/2010 | Reed | B01F 3/0807 44/354 |
| 2015/0361334 A1 * | 12/2015 | Kwon | H01L 51/0045 252/301.16 |

* cited by examiner

*Primary Examiner* — Cephia D Toomer
(74) *Attorney, Agent, or Firm* — Bajwa IP Law Firm; Haris Zaheer Bajwa

(57) ABSTRACT

Disclosed herein is a method for synthesizing a nano-emulsion fuel composition. The method may include forming a water-in-fossil fuel emulsion by dispersing water into a fossil fuel in the presence of a surfactant, synthesizing carbon quantum dots with an average diameter between 0.5 nanometers to 20 nanometers, forming a mixture of the synthesized carbon quantum dots and the water-in-fossil fuel emulsion by dispersing the synthesized carbon quantum dots into the water-in-fossil fuel emulsion; the carbon quantum dots comprising 1 ppm to 10000 ppm of the mixture, and forming a nano-emulsion fuel composition by mixing a biofuel into the mixture of carbon quantum dots and the water-in-fossil fuel emulsion.

12 Claims, 14 Drawing Sheets

(51) Int. Cl.
*C10L 10/18* (2006.01)
*C01B 32/168* (2017.01)
*C01B 32/348* (2017.01)
*C01B 32/354* (2017.01)
*C01B 32/15* (2017.01)
*C10L 1/188* (2006.01)
*B82Y 30/00* (2011.01)
*B82Y 40/00* (2011.01)

(52) U.S. Cl.
CPC .......... *C01B 32/348* (2017.08); *C01B 32/354* (2017.08); *C10L 1/12* (2013.01); *C10L 1/1208* (2013.01); *C10L 1/1883* (2013.01); *C10L 1/32* (2013.01); *C10L 1/324* (2013.01); *C10L 10/18* (2013.01); *B82Y 30/00* (2013.01); *B82Y 40/00* (2013.01); *C01P 2004/64* (2013.01); *C10L 2200/0209* (2013.01); *C10L 2200/0476* (2013.01); *C10L 2230/22* (2013.01); *C10L 2250/06* (2013.01); *C10L 2250/084* (2013.01); *C10L 2250/086* (2013.01); *C10L 2250/088* (2013.01); *C10L 2270/02* (2013.01); *C10L 2270/026* (2013.01)

(58) Field of Classification Search
CPC ........... C10L 1/1883; C10L 2200/0476; C10L 2250/086; C10L 2250/088; C10L 2250/06; C10L 2230/22; C10L 2270/026; C10L 2200/0209; C10L 2250/084; C10L 2270/02; C01B 32/168; C01B 32/348; C01B 32/354; C01B 32/15; C01P 2004/64; B82Y 30/00; B82Y 40/00
See application file for complete search history.

BIO-NANO EMULSION FUEL

CROSS-REFERENCE TO RELATED APPLICATION

This application claims the benefit of priority from U.S. Provisional Patent Application Ser. No. 62/516,116, filed on Jun. 7, 2017, and entitled "BIO-NANO EMULSION FUELS," which is incorporated herein by reference in its entirety.

TECHNICAL FIELD

The present disclosure relates to emulsified fuels, particularly to bio-nano emulsion fuels and methods of improving fuel combustion.

BACKGROUND

The high and growing costs of fossil fuels and the problem of depletion of these non-renewable resources has led to efforts for improving the efficiency of energy-consuming systems. Internal combustion engines that are extensively used nowadays are one of the main consumers of fossil fuels. Most internal combustion engines produce undesirable pollutants during the combustion process. These undesirable pollutants are produced as a result of incomplete combustion, nitrogen separation, and presence of impurities in the fossil fuels and air. Nitrogen oxides ($NO_x$), unburned hydrocarbons (HC), carbon oxides ($CO_x$), sulfur oxides ($SO_x$), soot, and other carbon particles are some of the more impactful pollutants emitted by the internal combustion engines. These pollutants have a negative impact on the environment and cause health problems including causing global warming, air pollution, acid rains, breathing problems, etc.

One possible solution to overcome the incomplete combustion process in the internal combustion engines is the upgrading and improving of fuel compositions. Instead of conducting cost prohibitive research on changing the design of internal combustion engines, additives and catalysts may be mixed in with fuel compositions to alter aspects of the combustion process toward a more complete combustion reaction and more efficient fuel consumption.

Different methods may be used for optimizing fuel consumption and reducing the emission of pollutants. For example, fuel-water emulsions may be prepared by mixing water into a fuel composition, which may improve combustion efficiency and pollutants emission. In another example, nanotechnology may be utilized to enhance the properties of the fuel. Specifically, nano-additives can be used for lowering the amount of harmful pollutants emitted during the process of combustion and simultaneously increase the efficiency of the combustion process. Different types of metal and metal oxide nanoparticles such as platinum, cobalt, radium, iridium, nickel, palladium, copper, silver, gold, zinc, aluminum, alumina, calcium oxide, titanium oxide, zirconium oxide, iron oxides, ruthenium oxide, osmium oxide, cobalt oxide, radium oxide, iridium oxide, nickel oxide, silver oxide, gold oxide, zinc oxide, cerium oxide etc. have been studied as additives in fossil fuels. However, there are some concerns regarding the potential harmful effects of the nanoparticles on human health, especially in case of metal and metal oxide nanoparticles. Since metal and metal oxide nanoparticles may have a poisonous impact on living organisms, there is a need in the art to find other biodegradable nano-additives, such as biodegradable carbon nanoparticles to optimize fuel consumption and reduce the emission of pollutants minimizing any harmful impact on human health and environment.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more exemplary embodiments, the present disclosure is directed to a method for synthesizing a bio-nano emulsion fuel composition. The method may include forming a water-in-fossil fuel emulsion by dispersing water into a fossil fuel in the presence of a surfactant, synthesizing carbon quantum dots with an average diameter between 0.5 nanometers to 20 nanometers, forming a mixture of the synthesized carbon quantum dots and the water-in-fossil fuel emulsion by dispersing the synthesized carbon quantum dots into the water-in-fossil fuel emulsion; the carbon quantum dots comprising 1 ppm to 100 ppm of the mixture, and forming a nano-emulsion fuel composition by mixing a biofuel into the mixture of carbon quantum dots and the water-in-fossil fuel emulsion.

According to some exemplary embodiments, synthesizing carbon quantum dots may include forming a precursor suspension by dissolving a carbon precursor in water, the carbon precursor selected from the group consisting of graphene, graphene oxide, carbon nanotubes, fullerene, carbon nano-fibers, active carbon, soot, organic acids, and combinations thereof, and forming carbon quantum dots by heating the precursor suspension at a temperature between 160° C. and 220° C.

According to some exemplary embodiments, synthesizing carbon quantum dots may include forming a precursor suspension by dissolving a carbon precursor in water, the carbon precursor selected from the group consisting of graphene, graphene oxide, carbon nanotubes, fullerene, carbon nano-fibers, active carbon, soot, organic acids, and combinations thereof, forming carbon quantum dots by heating the precursor suspension at a temperature between 160° C. and 220° C., carbonizing the carbon quantum dots at a temperature of at least 700° C. under an inert gas atmosphere, activating the carbonized carbon quantum dots by mixing the carbonized carbon quantum dots with an alkali metal hydroxide solution, and functionalizing the activated carbon quantum dots by passing nitric acid vapor with a temperature between 100° C. and 150° C. through a heated bed of the activated carbon quantum dots, the heated bed being heated at a temperature between 125° C. and 250° C.

According to an exemplary embodiment, forming a water-in-fossil fuel emulsion may include forming a water-in-fossil fuel emulsion by dispersing water into a fossil fuel in the presence of a surfactant, the water comprising 0.01 to 50 vol % of the bio-nano emulsion fuel composition.

According to some exemplary embodiments, forming a bio-nano emulsion fuel composition by mixing a biofuel into the mixture of carbon quantum dots and the water-in-fossil fuel emulsion may include mixing the biofuel into the mixture of carbon quantum dots and the water-in-fossil fuel emulsion, the biofuel comprising 0 to 99 vol % of the bio-nano emulsion fuel composition.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples to provide a thorough understanding of the relevant teachings related to the exemplary embodiments. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be plain to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Disclosed herein is a bio-nano emulsion fuel composition and method for synthesizing the bio-nano emulsion fuel. Carbon quantum dots, functionalized carbon quantum dots, or a combination thereof are dispersed into the bio-nano emulsion fuel composition of exemplary embodiments of the present disclosure to improve the combustion process of the fuel composition. The exemplary composition utilizes a combination of biodegradable carbon quantum dots, water, and biofuels alongside the fossil fuel to ensure a complete fuel combustion process and thereby increase the efficiency of the fuel combustion process and reduce the production of pollutants. Furthermore, utilizing the biodegradable carbon quantum dots helps avoid the toxicity of metal or metal oxide nanoparticles while avoiding the costly synthesis methods of other carbon nanoparticles.

Figure 1:
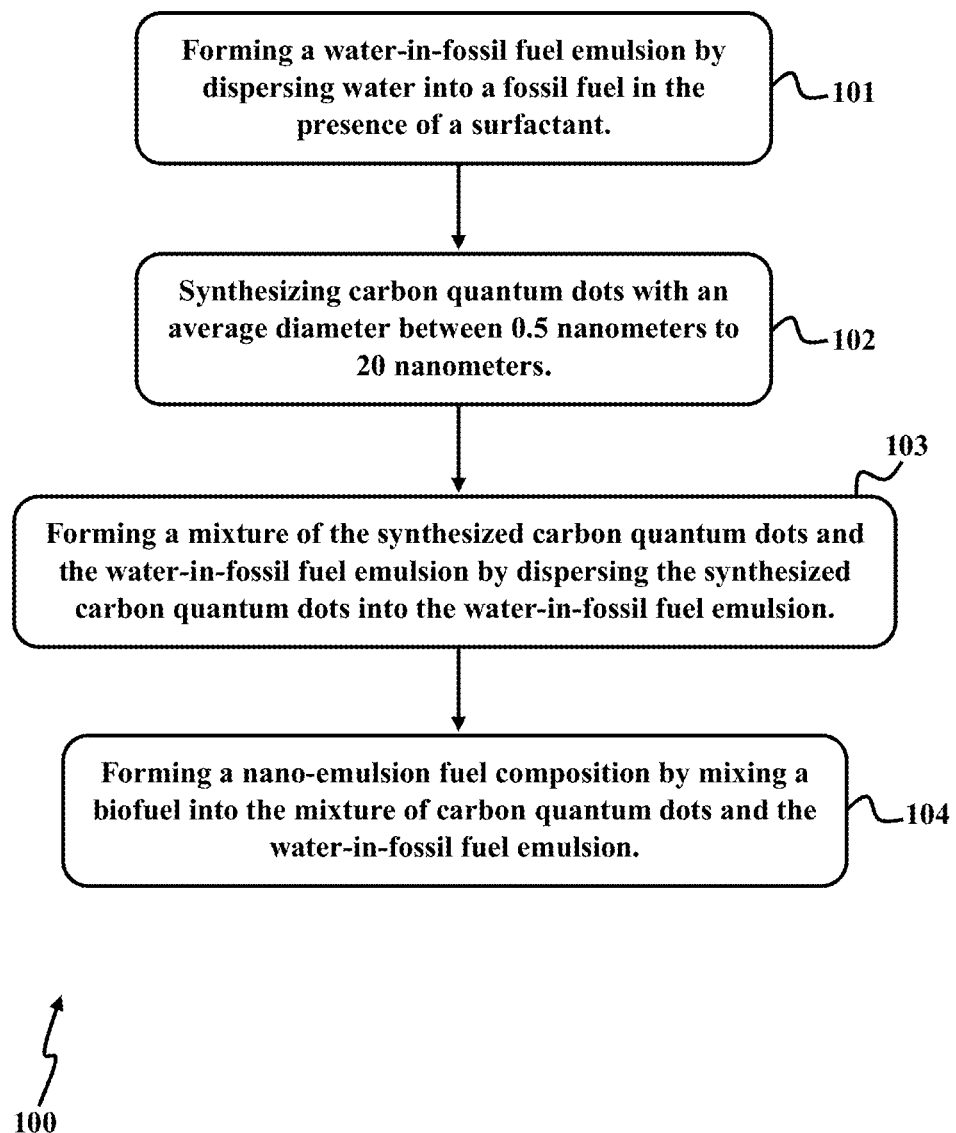
FIG. 1 illustrates a method for synthesizing a bio-nano emulsion fuel composition, consistent with one or more exemplary embodiments of the present disclosure.

FIG. 1 illustrates method 100 for synthesizing a bio-nano emulsion fuel composition, consistent with one or more exemplary embodiments of the present disclosure. Method 100 may include step 101 of forming a water-in-fossil fuel emulsion by dispersing water into a fossil fuel in the presence of a surfactant, step 102 of synthesizing carbon quantum dots with an average diameter between 0.5 nanometers to 20 nanometers, step 103 of forming a mixture of the synthesized carbon quantum dots and the water-in-fossil fuel emulsion by dispersing the synthesized carbon quantum dots into the water-in-fossil fuel emulsion, step 104 of forming a bio-nano emulsion fuel composition by mixing a biofuel into the mixture of carbon quantum dots and the water-in-fossil fuel emulsion.

Referring to FIG. 1, according to one or more exemplary embodiments, step 101 of forming a water-in-fossil fuel emulsion by dispersing water into a fossil fuel in the presence of a surfactant may include dispersing water droplets into the fossil fuel in the presence of surfactants such as fatty acids. A fatty acid, such as oleic acid may be mixed with the water and the fossil fuel in a stirred vessel which is rigorously stirred with a stirrer speed of for example 500 rpm to 1000 rpm. According to an exemplary embodiment, a first mixture may be formed by mixing the fossil fuel with oleic acid and mono ethanol amine in a stirred vessel where a part of the oleic acid is neutralized and a neutral salt may form that functions as a hydrophilic agent, while the remaining oleic acid functions as a lipophilic agent in the first mixture. Then fossil fuel, water, and a co-solvent such as n-Hexanol may be mixed with the first mixture in the stirred vessel.

Referring to FIG. 1, according to an exemplary embodiment, step 101 of forming a water-in-fossil fuel emulsion by dispersing water into a fossil fuel in the presence of a surfactant may include forming a water-in-diesel emulsion by dispersing water into diesel in the presence of a fatty acid. In an example, to form every 100 mL of the water-in-diesel emulsion, first 0.01 to 50 mL of the fatty acid and a balancing amount of mono ethanol amine may be stirred together in a stirred vessel with a stirrer speed of 500 rpm to 1000 rpm for a period of time between 1 to ten minutes. Then, 1 to 99 mL of diesel, 0.01 to 50 mL of water, and 0.01 to 50 mL of a co-solvent such as n-Hexanol may be added to the stirred vessel. After a stirring time of about 1 to 5 minutes after diesel, water, and co-solvent are added to the stirred vessel, water droplets may be thoroughly dispersed inside the diesel and a clear and stable water-in-diesel emulsion may be obtained.

Referring to FIG. 1, according to one or more exemplary embodiments, step 102 of synthesizing carbon quantum dots with an average diameter between 0.5 nanometers to 20 nanometers may include synthesizing carbon quantum dots via either a top-down or a bottom-up synthesis route. As used herein, the top-down synthesis route may involve breaking down larger carbon structures such as graphite and carbon nanotubes into carbon quantum dots using laser ablation, arc discharge, or electrochemical methods. The bottom-up synthesis route may involve synthesizing carbon quantum dots from small precursors such as carbohydrates and citrate via, for example, a hydrothermal process. According to an exemplary embodiment, step 102 of synthesizing carbon quantum dots with an average diameter between 0.5 nanometers to 20 nanometers may include synthesizing carbon quantum dots from a precursor by a hydrothermal process. The precursor may be selected from carbon precursors such as graphene, graphene oxide, carbon nanotubes, fullerene, carbon nano-fibers, active carbon, soot, organic acids (e.g., sucrose, glucose, citric acid, etc.) and natural precursors like tree leaves, fruit marc, fruit juice, fruit skin, soya, egg, sugar cane extract, gelatin, chitosan, etc.

Figure 2A:
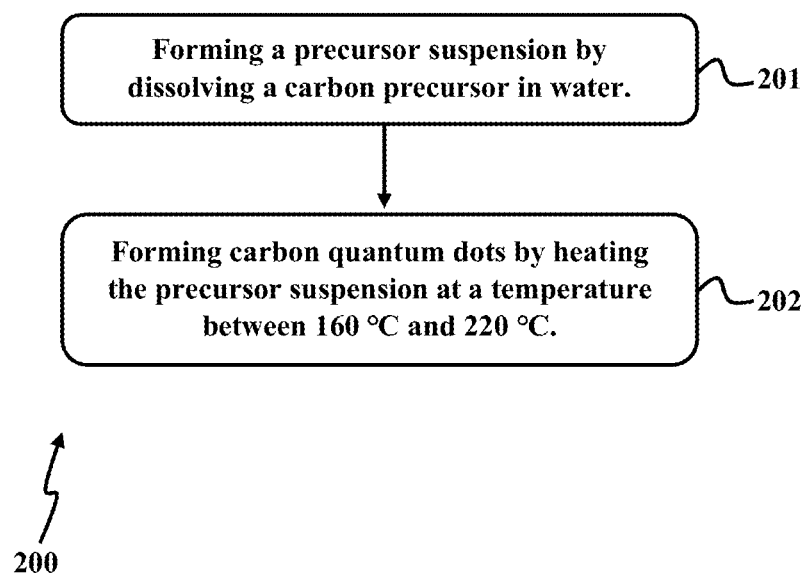
FIG. 2A illustrates method for synthesizing carbon quantum dots, consistent with one or more exemplary embodiments of the present disclosure.

FIG. 2A illustrates a method 200 for synthesizing carbon quantum dots with an average diameter between 0.5 nanometers to 20 nanometers, consistent with one or more exemplary embodiments of the present disclosure. Method 200 is an exemplary embodiment of step 102 of method 100. Referring to FIG. 2A, method 200 may include step 201 of forming a precursor suspension by dissolving a carbon precursor in water, and step 202 of forming carbon quantum dots by heating the precursor suspension at a temperature between 160° C. and 220° C. According to an embodiment, method 200 may further include an optional step of drying the formed carbon quantum dots at a temperature of at least 80° C.

Referring to FIG. 2A, according to an exemplary embodiment, step 201 of forming a precursor suspension by dissolving a carbon precursor in water may include forming a precursor suspension by dissolving citric acid and urea in water with citric acid:urea:water ratio of 1:3:5. According to another exemplary embodiment, step 202 of forming carbon quantum dots by heating the precursor suspension at a temperature between 160° C. and 220° C. may include heating the precursor suspension at a temperature between 160° C. and 220° C. for at least 4 hours.

Figure 2B:
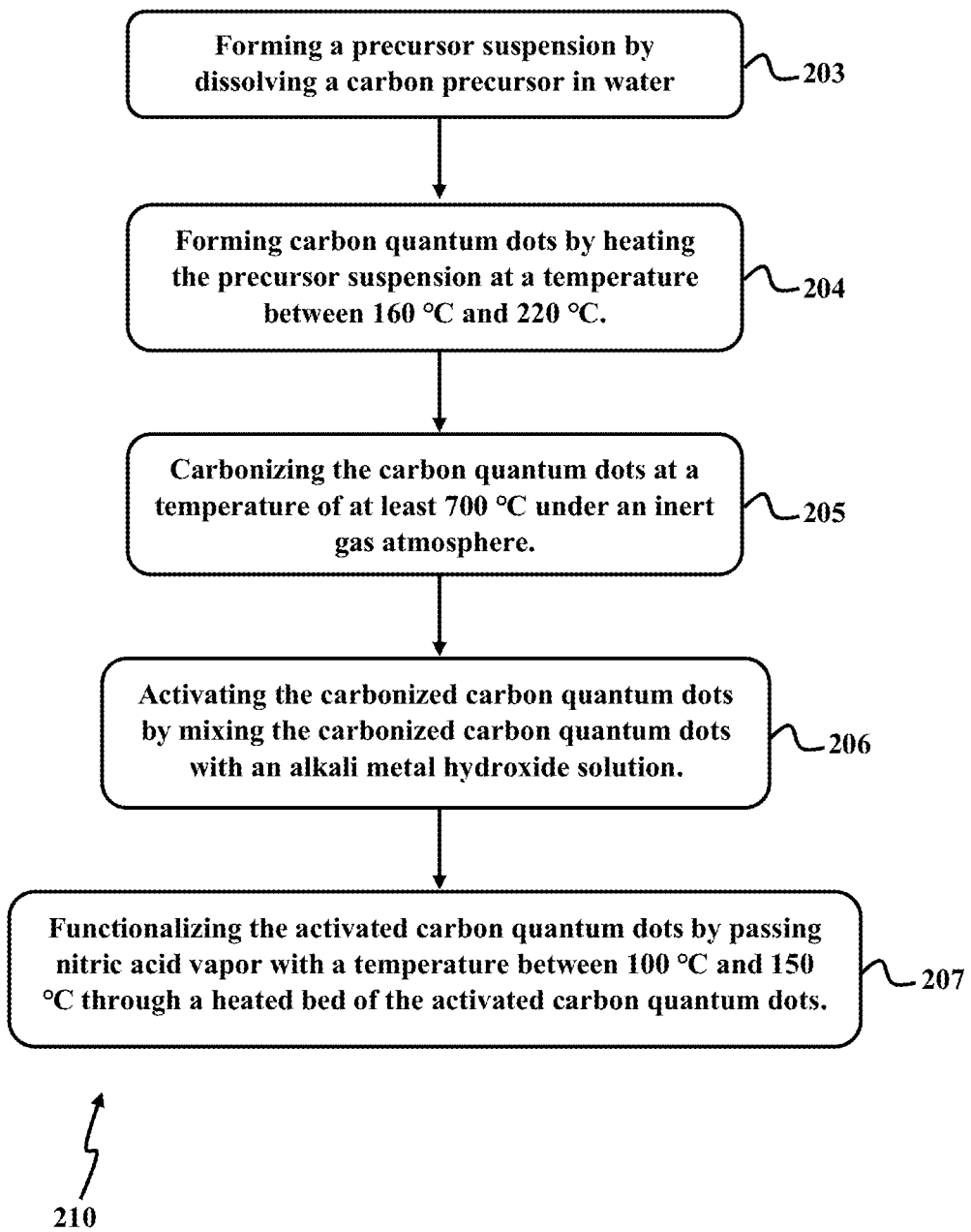
FIG. 2B illustrates a method for synthesizing functionalized carbon quantum dots, consistent with one or more exemplary embodiments of the present disclosure.

FIG. 2B is a method 210 for synthesizing functionalized carbon quantum dots with an average diameter between 0.5 nanometers to 20 nanometers, consistent with one or more exemplary embodiments of the present disclosure. Method 210 is another exemplary embodiment of step 102 of method 100. Referring to FIG. 2B, method 210 may include step 203 of forming a precursor suspension by dissolving a carbon precursor in water, step 204 of forming carbon quantum dots by heating the precursor suspension at a temperature between 160° C. and 220° C., step 205 of carbonizing the carbon quantum dots at a temperature of at least 700° C. under an inert gas atmosphere, step 206 of activating the carbonized carbon quantum dots by mixing the carbonized carbon quantum dots with an alkali metal hydroxide solution, and step 207 of functionalizing the activated carbon quantum dots by passing nitric acid vapor with a temperature between 100° C. and 150° C. through a heated bed of the activated carbon quantum dots.

Referring to FIG. 2B, according to an exemplary embodiment, step 203 of forming a precursor suspension by dissolving a carbon precursor in water may be similar to step 201 of FIG. 2A and step 204 of forming carbon quantum dots by heating the precursor suspension at a temperature between 160° C. and 220° C. may be similar to step 202 of FIG. 2A.

Referring to FIG. 2B, according to an exemplary embodiment, step 205 of carbonizing the carbon quantum dots at a temperature of at least 700° C. under an inert gas atmosphere may include heating the carbon quantum dots at a temperature between 600° C. and 900° C. under nitrogen or argon atmosphere. According to an exemplary embodiment, carbonizing the carbon quantum dots at a temperature of at least 700° C. under an inert gas atmosphere may include heating the carbon quantum dots in a heating system such as a furnace at a temperature of at least 700° C. under nitrogen or argon atmosphere for at least 1 hour.

Referring to FIG. 2B, according to an exemplary embodiment, step 206 of activating the carbonized carbon quantum dots by mixing the carbonized carbon quantum dots with an alkali metal hydroxide solution may include mixing the carbonized carbon quantum dots with an alkali metal hydroxide solution and then heating the mixture of the carbonized carbon quantum dots and the alkali metal hydroxide solution at 800° C. under a nitrogen or argon atmosphere for at least 1 hour. According to an exemplary embodiment, the carbonized carbon quantum dots may be mixed with an alkali metal hydroxide solution such as a KOH solution with a (carbonized carbon quantum dots: KOH) ratio of 1:1.5 to 2:3.

With reference to FIG. 2B, according to some exemplary embodiments, step 207 of functionalizing the activated carbon quantum dots by passing nitric acid vapor with a temperature between 100° C. and 150° C. through a heated bed of the activated carbon quantum dots may include forming a bed of the activated carbon quantum dots, heating the formed bed of the activated carbon quantum dots by, for example, a heating element at a temperature between 125° C. and 250° C., passing a vapor stream of nitric acid through the bed of the activated carbon quantum dots by heating concentrated nitric acid at a temperature between 100° C. and 150° C. in a vessel and then guiding the produced nitric acid vapor through the bed of the activated carbon quantum dots. According to an exemplary embodiment, functionalizing the activated carbon quantum dots by passing nitric acid vapor with a temperature between 100° C. and 150° C. through a heated bed of the activated carbon quantum dots may include passing nitric acid vapor with a temperature between 100° C. and 150° C. through a heated bed of the activated carbon quantum dots for a predetermined amount of time between 2 and 24 hours, and then cutting off the vapor stream of nitric acid and leaving the bed of now functionalized carbon quantum dots to dry. With respect to step 207, the activated carbon quantum dots may be functionalized with functional groups of hydroxyl and carboxyl.

Referring back to FIG. 1, according to some exemplary embodiments, step 103 may involve forming a mixture of the synthesized carbon quantum dots and the water-in-fossil fuel emulsion by dispersing the synthesized carbon quantum dots into the water-in-fossil fuel emulsion. According to an exemplary embodiment, dispersing the synthesized carbon quantum dots into the water-in-fossil fuel emulsion may include adding the synthesized carbon quantum dots with a predetermined concentration between 1 ppm and 10000 ppm to the water-in-fossil fuel emulsion and then dispersing the synthesized carbon quantum dots into the water-in-fossil fuel emulsion by ultrasonic waves. Due to the small size of the synthesized carbon quantum dots, which may be between 0.5 nm and 20 nm, and functional groups on the carbon quantum dots, such as oxygen-containing functional groups, the synthesized carbon quantum dots may be thoroughly dispersed into the water-in-fossil fuel emulsion. According to an exemplary embodiment, forming a mixture of the synthesized carbon quantum dots and the water-in-fossil fuel emulsion by dispersing the synthesized carbon quantum dots into the water-in-fossil fuel emulsion may include dispersing about 1 ppm to 10000 ppm of the synthesized carbon quantum dots into a water-in-diesel emulsion. To this end, ultrasonic waves may be applied to a mixture of 1 ppm to 10000 ppm of the synthesized carbon quantum dots and the water-in-diesel emulsion for at least 1 minute.

With reference to FIG. 1, according to some exemplary embodiments, step 104 may involve forming a bio-nano emulsion fuel composition by mixing a biofuel into the mixture of carbon quantum dots and the water-in-fossil fuel emulsion. The biofuel may be easily mixed into the fossil fuel phase of the mixture of carbon quantum dots and the water-in-fossil fuel emulsion. According to an exemplary embodiment, mixing a biofuel into the mixture of carbon quantum dots and the water-in-fossil fuel emulsion may include mixing a biodiesel into the mixture of carbon quantum dots and the water-in-diesel emulsion such that the biodiesel may comprise [0] to [99] vol % of the a bio-nano emulsion fuel composition.

Example 1: Synthesizing Carbon Quantum Dots with Urea and Citric Acid as Precursors In this example, carbon quantum dots are synthesized by a hydrothermal method with urea and citric acid as precursors. To this end, an initial precursor including 0.21 grams of citric acid and 0.18 grams of urea was dissolved in 5 grams of water to obtain a first solution. The first solution was then transferred into an autoclave and underwent a hydrothermal process in the autoclave at 160° C. for 4 hours. The resultant solution was then removed from the autoclave and was dried at 80° C. and about 0.4 grams of carbon quantum dots were synthesized per every gram of the initial precursor. As-prepared carbon quantum dots are referred to hereinafter as CQDs.

Figure 3:
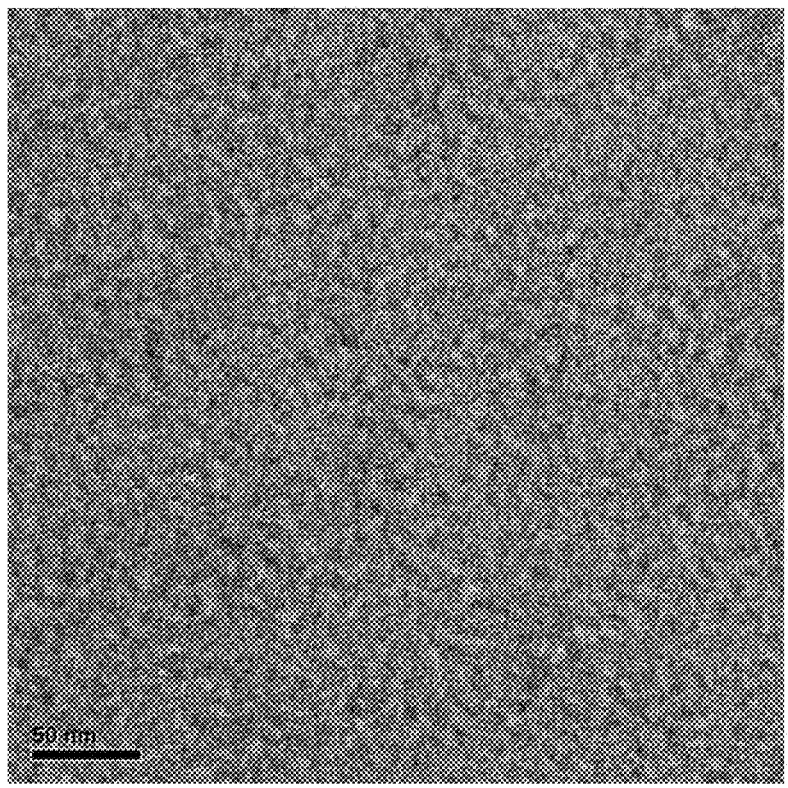
FIG. 3 is a high-resolution transmission electron microscope (HR-TEM) image of the synthesized carbon quantum dots, consistent with one or more exemplary embodiments of the present disclosure.

FIG. 3 is a high-resolution transmission electron microscope (HR-TEM) image of the synthesized CQDs, consistent with one or more exemplary embodiments of the present disclosure. Referring to FIG. 3, the average size of the synthesized CQDs is less than 20 nm.

Figure 4:
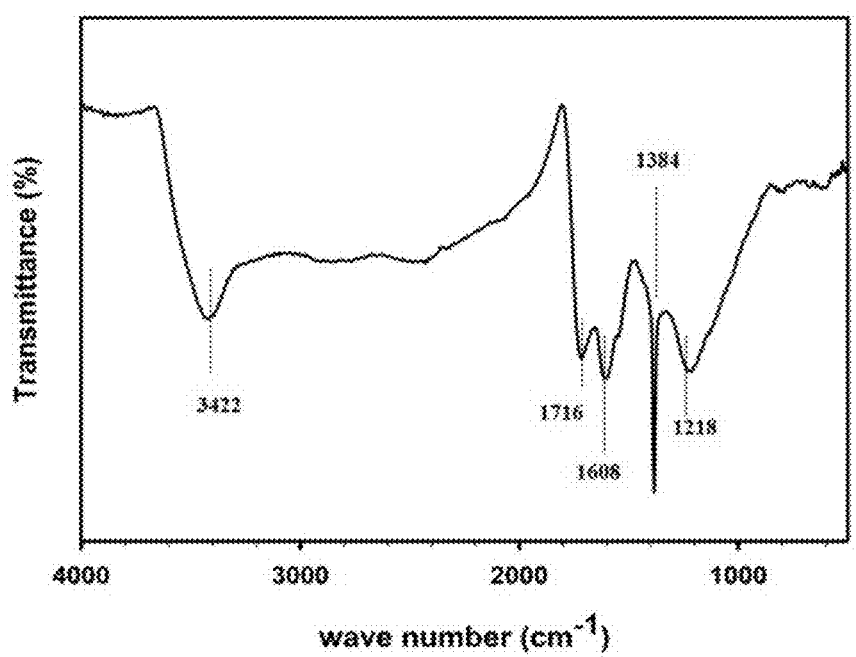
FIG. 4 illustrates an infrared spectrum of the synthesized carbon quantum dots, consistent with one or more exemplary embodiments of the present disclosure.

FIG. 4 illustrates an infrared spectrum of the synthesized CQDs, consistent with one or more exemplary embodiments of the present disclosure. Referring to FIG. 4 the broad absorption peak observed in 3100-3500 $cm^{-1}$ region is indicative of the presence of OH groups related to HO—C═O and/or C—OH; of course, the N—H tensile absorption also overlaps in this region. The characteristic absorption of C—O, C—N, and $CH_2$ emerges in 1403 $cm^{-1}$, 1169 $cm^{-1}$ and 1323 $cm^{-1}$, respectively. The peaks observed in 1575 $cm^{-1}$ and 894 $cm^{-1}$ result from tensile absorptions related to C═C. The tensile and flexural vibrations special for bonds between carbon and the heteroatom is observed in the structure of synthesized CQDs due to the presence of functional groups of oxygen and nitrogen in the structure of synthesized CQDs.

According to one or more exemplary embodiments of the present disclosure, a bio-nano emulsion fuel composition synthesized by method 100 of FIG. 1 may include 0 to 99 vol % of a fossil fuel such as diesel oil, gasoline, ethanol, methanol or combinations thereof, 0 to 99 vol % of a biofuel such as biodiesel, bioethanol or combinations thereof, 0.01 to 50 vol % of water, and 1 to 10000 ppm of carbon quantum dots with average diameters between 0.5 nm to 20 nm. According to an exemplary embodiment, the bio-nano emulsion fuel may include 0 to 99 vol % of diesel, 0 to 99 vol % of biodiesel, 0.01 to 50 vol % water, and 1 to 100 ppm of carbon quantum dots with average diameters between 0.5 nm to 20 nm.

Example 2: Synthesizing Functionalized Carbon Quantum Dots with Urea and Citric Acid as Precursors In this example, functionalized carbon quantum dots are synthesized by a hydrothermal method with urea and citric acid as precursors. To this end, an initial precursor including 0.21 grams of citric acid and 0.18 grams of urea was dissolved in 5 grams of water to obtain a second solution. The second solution was then transferred into an autoclave and underwent a hydrothermal process in the autoclave at 160° C. for 4 hours. The resultant solution was then removed from the autoclave and was dried at 80° C. to obtain the synthesized carbon quantum dots. The synthesized carbon quantum dots were then carbonized at 700° C. under an inert gas atmosphere for 1 hour. The carbonized carbon quantum dots were then activated by homogeneously mixing the carbonized carbon quantum dots with an alkali metal hydroxide solution, such as KOH with a KOH to carbonized quantum dots ratio (KOH:carbonized quantum dots) of about 2:3, and then applying heat treatment to the homogeneous solution of the carbonized carbon quantum dots and KOH at a temperature of 800° C. for 1 hour. The activated carbon quantum dots may then be functionalized by forming a bed of the activated carbon quantum dots that is heated at a temperature of 125° C. to 250° C.; passing a vapor of concentrated nitric acid with a temperature between 100° C. and 150° C. through the bed of the activated carbon quantum dots for at most 24 hours. The obtained functionalized carbon quantum dots are hereinafter referred to as CQD-Fs.

Figure 5:
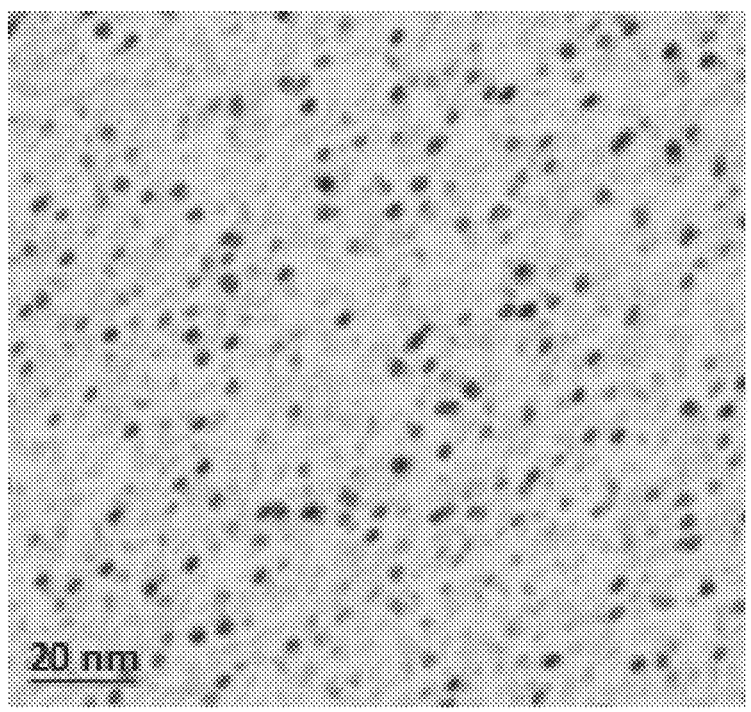
FIG. 5 is a high-resolution transmission electron microscope (HR-TEM) image of the synthesized functionalized carbon quantum dots, consistent with one or more exemplary embodiment of the present disclosure.

FIG. 5 is a high-resolution transmission electron microscope (HR-TEM) image of the synthesized CQD-Fs, consistent with one or more exemplary embodiment of the present disclosure. Referring to FIG. 5, the average size of the synthesized CQD-Fs is less than 20 nm.

Figure 6:
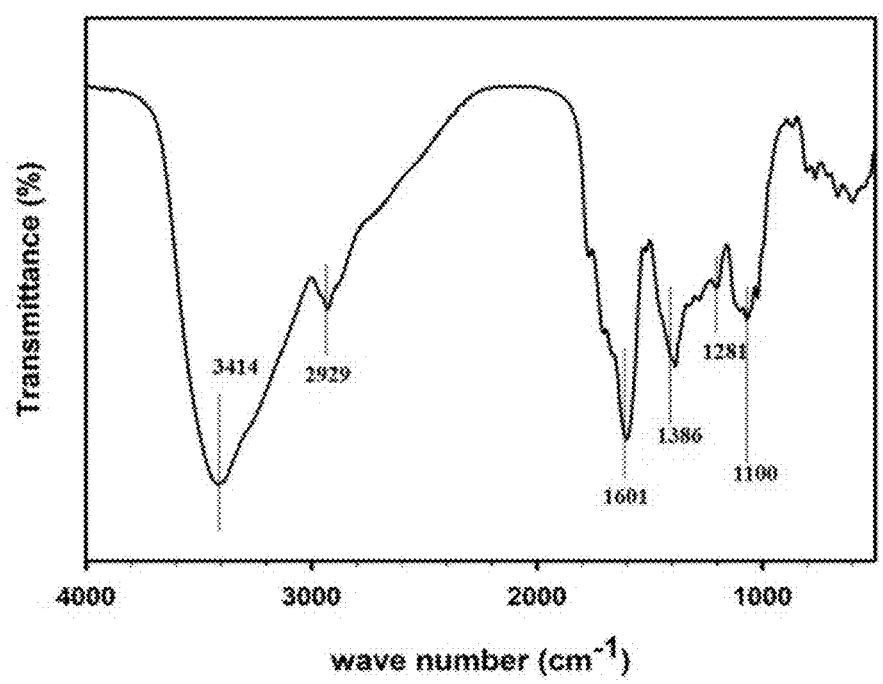
FIG. 6 illustrates infrared spectrum of the synthesized functionalized carbon quantum dots, consistent with one or more exemplary embodiments of the present disclosure.

FIG. 6 illustrates infrared spectrum of the synthesized CQD-Fs. Referring to FIG. 6, the wide absorption peak observed in 3200-3500 $cm^{-1}$ region is indicative of the existence of OH groups related to HO—C═O and/or C—OH. The peak observed in 1608 $cm^{-1}$ arises from aromatic bonds of C═C indicating the carbon structure.

Also, the absorption peaks observed in 1716 cm$^{-1}$ and 1384 cm$^{-1}$ show C—O and CH$_3$ bonds, respectively. Furthermore, the absorption peak in 1218 cm$^{-1}$ is the result of the presence of C—H and N—H bonds.

Example 3: Synthesizing Carbon Quantum Dots with Orange Peel as a Precursor

In this example, carbon quantum dots are synthesized by a hydrothermal method with orange peel as a precursor. To this end, 1 to 12 grams of powdered orange peel was mixed with 120 mL of deionized water. The obtained solution was then transferred to an autoclave where a hydrothermal process was applied to the obtained solution at 140° C. to 220° C. for 10 to 24 hours. After removing the resultant solution from the autoclave, the resultant solution was centrifuged with a speed of 5000 rpm to separate an upper solution from sediments. The separated upper solution contained carbon quantum dots which were later dried at 80° C. to 120° C. The as-produced carbon quantum dots are hereinafter referred to as CQD-Os.

Figure 7:
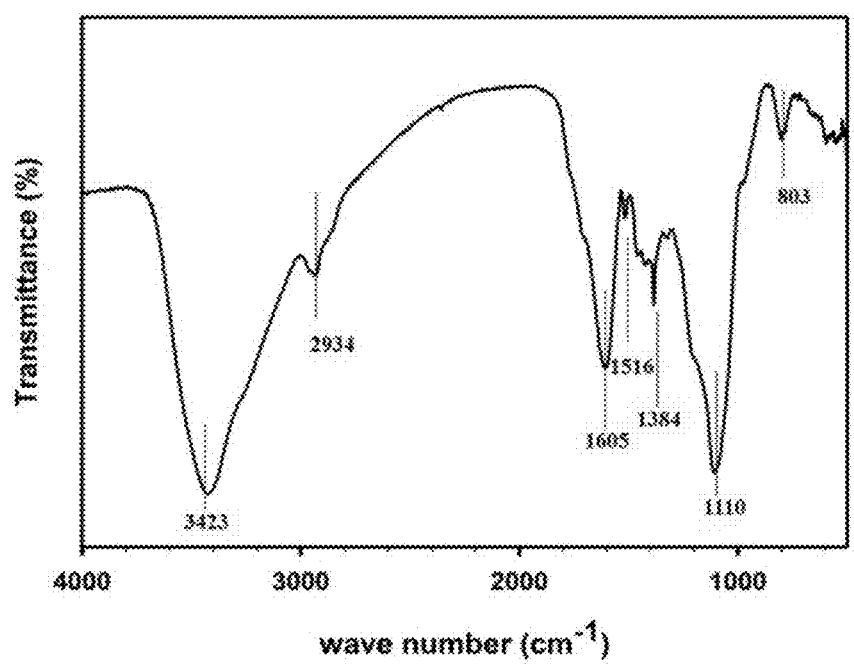
FIG. 7 illustrates infrared spectrum of the synthesized functionalized carbon quantum dots, consistent with one or more exemplary embodiments of the present disclosure.

FIG. 7 illustrates infrared spectrum of the synthesized f CQD-Os. Referring to FIG. 7, the presence of functional groups on the synthesized CQD-Os. The absorption peak observed in 1601 cm$^{-1}$ is the evidence for the presence of C=C bond. Also, two other absorption peaks in the region of 1600-1680 cm$^{-1}$ are indicative of the presence of C=C and C=N bonds; that's because of the characteristic peaks of the above bonds overlapping with each other. The absorption peaks appearing in 3414 cm$^{-1}$, 2929 cm$^{-1}$, 1386 cm$^{-1}$, 1281 cm$^{-1}$, and 1100 cm$^{-1}$ show the presence of OH, C—H, C—H, C—O, and C—O on the synthesized CQD-Os, respectively. As a result, the functional groups are present in the structure of CQD-Os due to the bond of carbon structure with nitrogen, hydrogen, and oxygen atoms.

Example 4: Synthesizing Carbon Quantum Dots with Olive Kernel as a Precursor In this example, carbon quantum dots are synthesized by a hydrothermal method with orange peel as a precursor. To this end, 1 to 12 grams of milled olive kernel was mixed with 120 mL of deionized water. The obtained solution was then transferred to an autoclave where a hydrothermal process was applied to the obtained solution at 160° C. to 220° C. for 10 to 24 hours. After removing the resultant solution from the autoclave, the resultant solution was centrifuged with a speed of 5000 rpm to separate an upper solution from sediments. The separated upper solution contained carbon quantum dots which were later dried at 80° C. to 120° C. The as-produced carbon quantum dots are hereinafter referred to as CQD-Hs.

Figure 8:
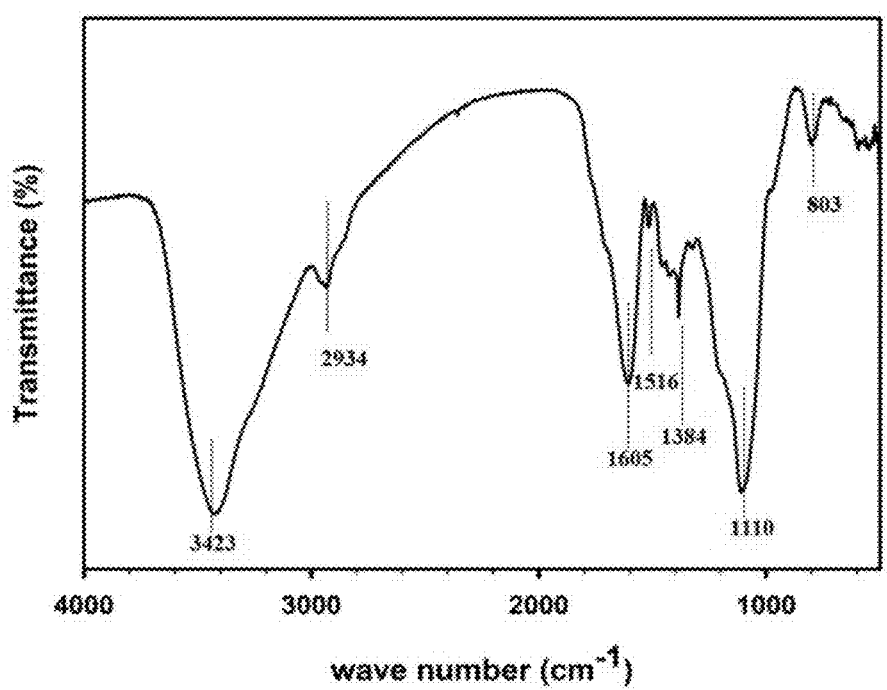
FIG. 8 illustrates infrared spectrum of the synthesized functionalized carbon quantum dots, consistent with one or more exemplary embodiments of the present disclosure.

FIG. 8 illustrates infrared spectrum of the synthesized CQD-Hs. Referring to FIG. 8, the absorption band in 1605 cm$^{-1}$ region is related to C=C vibration with sp$^2$ hybridization. The absorption peak in 3423 cm$^{-1}$ region is the evidence for the presence of OH groups related to C—OH and/or HO—C=O. The C—H characteristic absorption has appeared in 2934 cm$^{-1}$, 1384 cm$^{-1}$, and 803 cm$^{-1}$ regions, while C—O vibrations are evident in 1110 cm$^{-1}$ region.

Example 5: Synthesizing Bio-Nano Emulsion Fuel Sample B15+W10+CQD

In this example, bio-nano emulsion fuel samples are synthesized that contain diesel as the fossil fuel, biodiesel as the biofuel, carbon quantum dots, and water. Here, for synthesizing a 100 mL of a bio-nano emulsion fuel sample, a first mixture is formed by mixing 7 mL of a fatty acid, such as oleic acid, and 0.7 mL of mono ethanol amine in a stirred vessel with a stirrer speed of 500 to 1000 rpm. Then, 81.3 mL of diesel fuel, 10 mL of water, and 1 mL of a co-solvent such as n-Hexanol are added to the first mixture and after 1 to 5 minutes of stirring, water droplets are thoroughly dispersed inside the continuous phase of the diesel fuel and a clear and stable water-in-diesel fuel emulsion is formed. After that, 60 ppm of carbon quantum dots or graphene quantum dots are added to the water-in-diesel fuel emulsion while being exposed to ultrasonic waves in an ultrasound device for 1 minute. Due to their small size and many functional groups, carbon quantum dots are easily dispersed into the water droplets present in the water-in-diesel fuel emulsion and a clear second mixture is formed. At this stage, the bio-nano emulsion fuel sample is formed by mixing 15% by volume of a biodiesel with the second mixture. The biodiesel is easily mixed with the continuous diesel phase of the second mixture.

Example 6: Synthesizing Bio-Nano Emulsion Fuel Sample B15+W5+CQD

In this example, bio-nano emulsion fuel samples are synthesized that contain diesel as the fossil fuel, biodiesel as the biofuel, carbon quantum dots, and water. Here, for synthesizing a 100 mL of a bio-nano emulsion fuel sample (a diesel fuel containing 5% water), first, 4 mL of a fatty acid such as oleic acid and 0.4 mL of mono ethanol amine were mixed in a stirred vessel with a stirrer speed of 500 to 1000 rpm. Then, 89.1 mL of diesel fuel, 5 mL of water, and 1.5 mL of a co-solvent such as n-Hexanol are added to the first mixture and after 1 to 5 minutes of stirring, water droplets are thoroughly dispersed inside the continuous phase of the diesel fuel and a clear and stable water-in-diesel fuel emulsion is formed. After that, 60 ppm of carbon quantum dots or graphene quantum dots are added to the water-in-diesel fuel emulsion while being exposed to ultrasonic waves in an ultrasound device for 1 minute. Due to their small size and many functional groups, quantum dots are easily dispersed into the water droplets present in the water-in-diesel fuel emulsion and a clear second mixture is formed. At this stage, the bio-nano emulsion fuel sample is formed by mixing 15% by volume of a biodiesel with the second mixture. The biodiesel is easily mixed with the continuous diesel phase of the second mixture.

Example 7: Synthesizing Bio-nano Emulsion Fuel Sample B15+W5+CQD-F

In this example, bio-nano emulsion fuel samples are synthesized that contain diesel as the fossil fuel, biodiesel as the biofuel, carbon quantum dots, and water. Here, for synthesizing a 100 mL of a bio-nano emulsion fuel sample (a diesel fuel containing 5% water), at first 4 mL of a fatty acid such as oleic acid and 0.4 mL of mono ethanol amine were mixed in a stirred vessel with a stirrer speed of 500 to 1000 rpm. Then, 89.1 mL of diesel fuel, 5 mL of water, and 1.5 mL of a co-solvent such as n-Hexanol are added to the first mixture and after 1 to 5 minutes of stirring, water droplets are thoroughly dispersed inside the continuous phase of the diesel fuel and a clear and stable water-in-diesel fuel emulsion is formed. After that, 60 ppm of functionalized carbon quantum dots (CQD-F) is added to the water-in-diesel fuel emulsion while being exposed to ultrasonic waves in an ultrasound device for 1 minute. Due to their small size and many functional groups, quantum dots are easily dispersed into the water droplets present in the water-in-diesel fuel emulsion and a clear second mixture is formed. At this stage, the bio-nano emulsion fuel sample is formed by mixing 15% by volume of a biodiesel with the second mixture. The biodiesel is easily mixed with the continuous diesel phase of the second mixture.

Example 8: Synthesizing Fuel Sample B15+W5

In this example, emulsion fuel samples are synthesized that contain diesel as the fossil fuel, biodiesel as the biofuel, and water. Here, for synthesizing a 100 mL of a bio-nano emulsion fuel sample (a diesel fuel containing 5% water), at first 4 mL of a fatty acid such as oleic acid and 0.4 mL of mono ethanol amine were mixed in a stirred vessel with a stirrer speed of 500 to 1000 rpm. Then, 89.1 mL of diesel fuel, 5 mL of water, and 1.5 mL of a co-solvent such as n-Hexanol are added to the first mixture and after 1 to 5 minutes of stirring, water droplets are thoroughly dispersed inside the continuous phase of the diesel fuel and a clear and stable water-in-diesel fuel emulsion is formed. After that, the emulsion fuel sample is formed by mixing 15% by volume of a biodiesel with the second mixture. The biodiesel is easily mixed with the continuous diesel phase of the second mixture.

Example 9: Synthesizing Fuel Sample B15

In this example, bio-fuel samples are synthesized that contain diesel as the fossil fuel and biodiesel as the biofuel. Here, for synthesizing a 100 mL of a B15 sample (a diesel fuel containing 15% biodiesel), 15 mL biodiesel is added to the 85 mL of diesel fuel and after a little stirring, biodiesel mixed with the diesel fuel and a clear and stable bio-fuel is formed. The biodiesel is easily mixed with the continuous diesel phase of the diesel fuel.

Example 10: Synthesizing Fuel Sample B15+W5+CQD-H

In this example, bio-nano emulsion fuel samples are synthesized that contain diesel as the fossil fuel, biodiesel as the biofuel, carbon quantum dots, and water. Here, for synthesizing a 100 mL of a bio-nano emulsion fuel sample (a diesel fuel containing 5% water), at first 4 mL of a fatty acid such as oleic acid and 0.4 mL of mono ethanol amine were mixed in a stirred vessel with a stirrer speed of 500 to 1000 rpm. Then, 89.1 mL of diesel fuel, 5 mL of water, and 1.5 mL of a co-solvent such as n-Hexanol are added to the first mixture and after 1 to 5 minutes of stirring, water droplets are thoroughly dispersed inside the continuous phase of the diesel fuel and a clear and stable water-in-diesel fuel emulsion is formed. After that, 60 ppm of carbon quantum dots (CQD-H) is added to the water-in-diesel fuel emulsion while being exposed to ultrasonic waves in an ultrasound device for 1 minute. Due to their small size and many functional groups, carbon quantum dots are easily dispersed into the water droplets present in the water-in-diesel fuel emulsion and a clear second mixture is formed. At this stage, the bio-nano emulsion fuel sample is formed by mixing 15% by volume of a biodiesel with the second mixture. The biodiesel is easily mixed with the continuous diesel phase of the second mixture.

Example 11: Effects of Synthesized Fuel Samples on a Diesel Engine Performance

The effect of synthesized fuel samples on the performance parameters of a diesel engine is investigated in this example. The performance parameters of the diesel engine may include torque and specific fuel consumption. Specific fuel consumption (SFC) is the mass rate of the fuel consumed for the generation of one kilowatt-hour actual work by the diesel engine. A one-cylinder diesel engine connected to an Eddy-Current Dynamometer was used to test the synthesized fuel samples. The samples included a pure diesel fuel, B15 fuel sample, B15+W5 fuel sample, and B15+W5+CQD bio-nano emulsion fuel sample.

Figure 9:
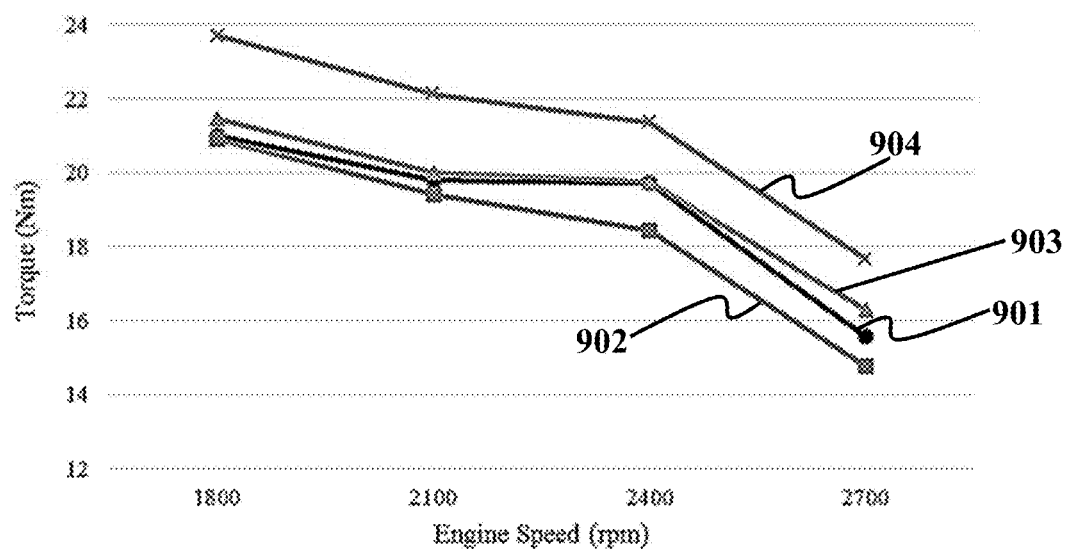
FIG. 9 is a torque versus engine speed diagram for the one-cylinder diesel engine burning four different fuel samples, consistent with one or more exemplary embodiments of the present disclosure.

FIG. 9 is a torque versus engine speed diagram for the one-cylinder diesel engine burning four different fuel samples. Referring to FIG. 9, torque versus speed diagram 901 is obtained for the one-cylinder diesel engine burning the diesel fuel; torque versus speed diagram 902 is obtained for the one-cylinder diesel engine burning the B15 fuel sample; torque versus speed diagram 903 is obtained for the one-cylinder diesel engine burning the B15+W5 fuel sample; and torque versus speed diagram 904 is obtained for the one-cylinder diesel engine burning the B15+W5+CQD bio-nano emulsion fuel sample.

Referring to FIG. 9, comparing torque versus speed diagram 901 and torque versus speed diagram 902 shows that the torque of the engine burning the B15 fuel sample is lower than that of the diesel engine burning the pure diesel fuel, which means the addition of the biodiesel to the diesel fuel reduces the engine torque. This may be due to the lower heat value of a biodiesel fuel compared to a diesel fuel. Comparing torque versus speed diagram 903 and torque versus speed diagram 902 shows that the torque of the diesel engine burning the B15+W5 sample is higher than that of the engine burning the B15 sample, which means by the addition of 5% water to B15 fuel sample, the amount of initial power reduction is compensated which can be the result of the phenomenon of micro-explosion of water particles leading to improved combustion. Comparing torque versus speed diagram 904 and torque versus speed diagram 901 shows that the torque of the diesel engine burning the B15+W5+CQD bio-nano emulsion fuel sample is considerably higher than that of the diesel engine burning the pure diesel fuel.

Figure 10:
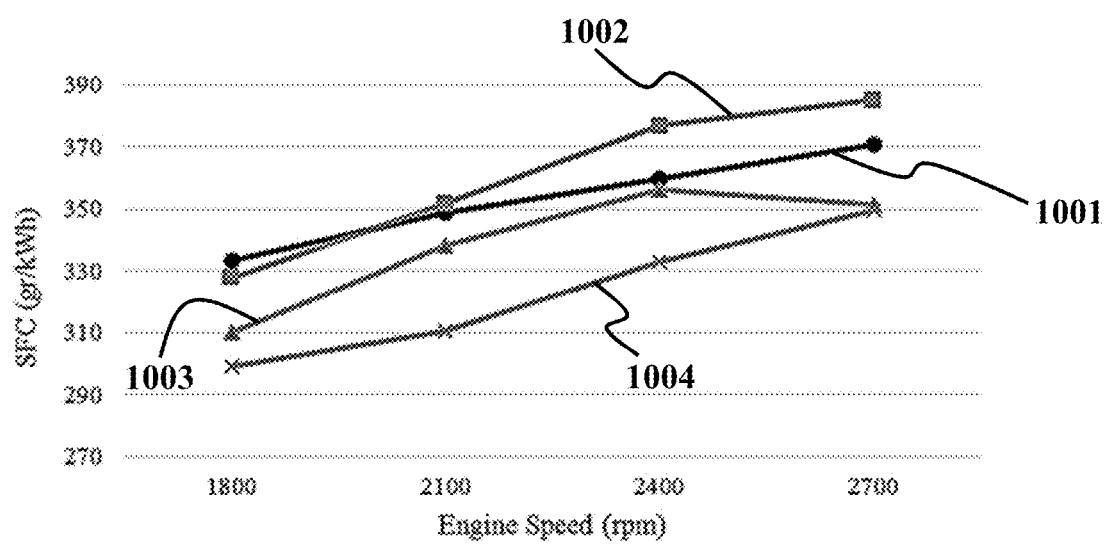
FIG. 10 is a specific fuel consumption (SFC) versus engine speed diagram for the one-cylinder diesel engine burning four different fuel samples, consistent with one or more exemplary embodiments of the present disclosure.

FIG. 10 is an SFC versus engine speed diagram for the one-cylinder diesel engine burning four different fuel samples. Referring to FIG. 10, SFC versus speed diagram 1001 is obtained for the one-cylinder diesel engine burning the diesel fuel; SFC versus speed diagram 1002 is obtained for the one-cylinder diesel engine burning the B15 fuel sample; SFC versus speed diagram 1003 is obtained for the one-cylinder diesel engine burning the B15+W5 fuel sample; and SFC versus speed diagram 1004 is obtained for the one-cylinder diesel engine burning the B15+W5+CQD bio-nano emulsion fuel sample. The results show that the SFC of the diesel engine has the lowest value when the B15+W5+CQD bio-nano emulsion fuel sample is burnt in the diesel engine. Referring to FIGS. 9 and 10, the results show that the addition of carbon quantum dot to the fuel composition improves both the torque and SFC performance of a diesel engine.

Example 12: Effects of Synthesized Fuel Samples on Pollutant Emission of a Diesel Engine Production of unburned or incompletely burned hydrocarbons like carbon monoxide is the result of incomplete combustion in an internal combustion engine. Unburned hydrocarbons are considered as pollutants.

Figure 11:
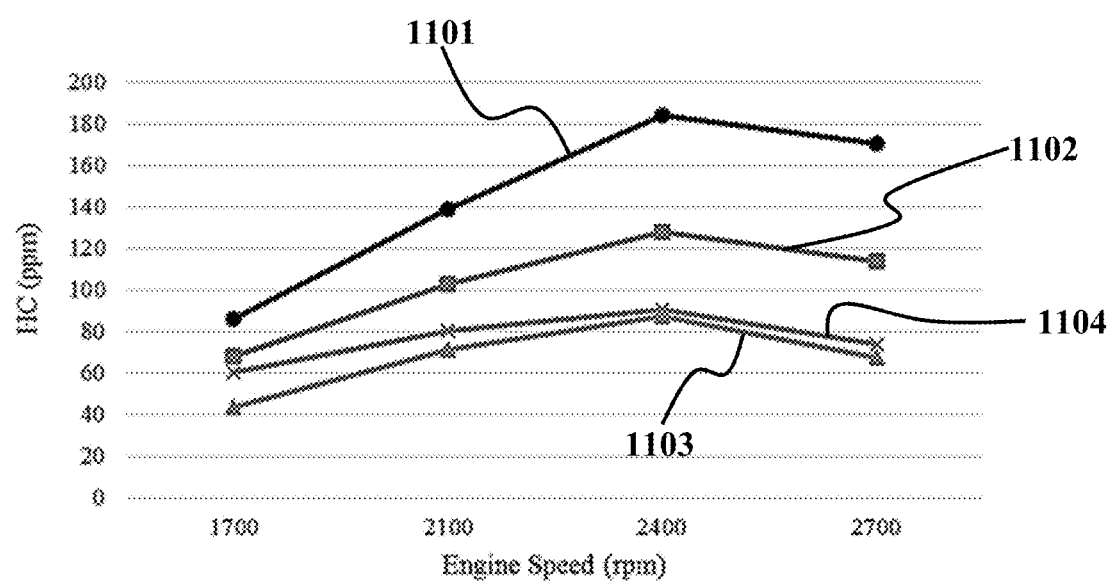
FIG. 11 is an unburned hydrocarbon amount versus engine speed diagram for the one-cylinder diesel engine burning four different fuel samples, consistent with one or more exemplary embodiments of the present disclosure.

FIG. 11 is an unburned hydrocarbon amount versus engine speed diagram for the one-cylinder diesel engine burning four different fuel samples. Referring to FIG. 11, unburned hydrocarbon amount versus speed diagram 1101 is obtained for the one-cylinder diesel engine burning the diesel fuel; unburned hydrocarbon amount versus speed diagram 1102 is obtained for the one-cylinder diesel engine burning the B15 fuel sample; unburned hydrocarbon amount versus speed diagram 1103 is obtained for the one-cylinder diesel engine burning the B15+W5 fuel sample; and unburned hydrocarbon amount versus speed diagram 1104 is obtained for the one-cylinder diesel engine burning the B15+W5+CQD-Fnano emulsion fuel sample. Referring to FIG. 11, the results show that the addition of carbon quantum dot to the fuel composition reduces the unburned hydrocarbon emission of the tested diesel engine by 30 to 57 percent at different engine speeds.

Carbon monoxide is a colorless, odorless, and very dangerous gas that may be produced during an incomplete process of combustion. The emission of carbon monoxide may depend on air to fuel ratio.

Figure 12:
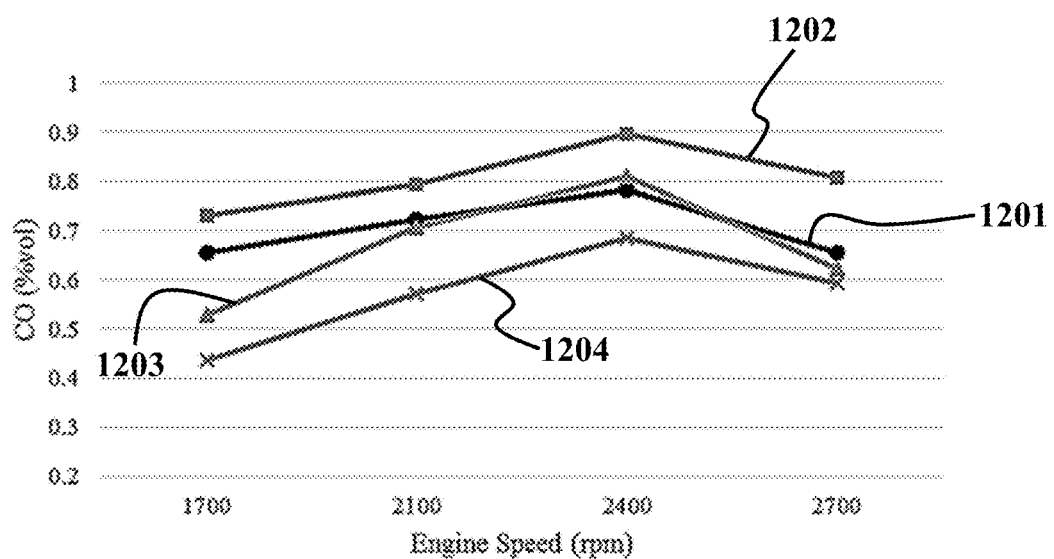
FIG. 12 is a carbon monoxide amount versus engine speed diagram for the one-cylinder diesel engine burning four different fuel samples, consistent with one or more exemplary embodiments of the present disclosure.

FIG. 12 is a carbon monoxide amount versus engine speed diagram for the one-cylinder diesel engine burning four different fuel samples. Referring to FIG. 12, carbon monoxide amount versus speed diagram 1201 is obtained for the one-cylinder diesel engine burning the diesel fuel; carbon monoxide amount versus speed diagram 1202 is obtained for the one-cylinder diesel engine burning the B15 fuel sample; carbon monoxide amount versus speed diagram 1203 is obtained for the one-cylinder diesel engine burning the B15+W5 fuel sample; and carbon monoxide amount versus speed diagram 1204 is obtained for the one-cylinder diesel engine burning the B15+W5+CQD bio-nano emulsion fuel sample. Referring to FIG. 12, the results show that the addition of carbon quantum dot to the fuel composition reduces the carbon monoxide emission of the tested diesel engine by 9 to 33 percent at different engine speeds.

The nitrogen oxides produced in the exhaust pipe of internal combustion engines are a combination of nitric oxide (NO) and nitrogen dioxide ($NO_2$). In fact, nitrogen and oxygen react at high temperature at a specific ratio and produce NOx compounds.

Figure 13:
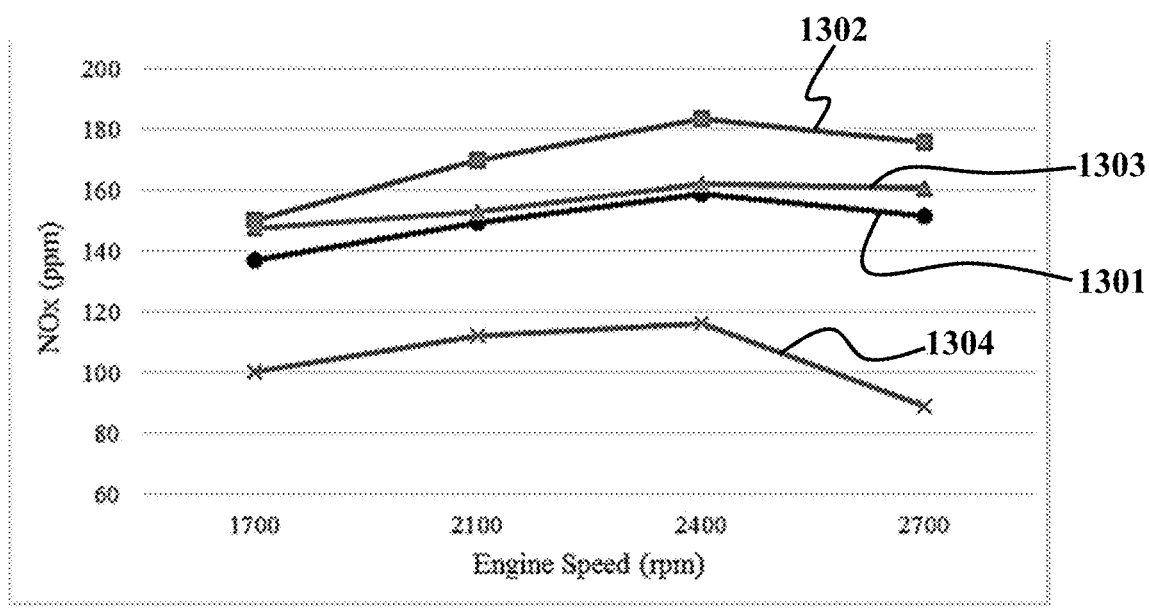
FIG. 13 is a Nitrogen Oxide amount versus engine speed diagram for the one-cylinder diesel engine burning four different fuel samples, consistent with one or more exemplary embodiments of the present disclosure.

FIG. 13 is a $NO_x$ amount versus engine speed diagram for the one-cylinder diesel engine burning four different fuel samples. Referring to FIG. 13, $NO_x$ amount versus speed diagram 1301 is obtained for the one-cylinder diesel engine burning the diesel fuel; $NO_x$ amount versus speed diagram 1302 is obtained for the one-cylinder diesel engine burning the B15 fuel sample; $NO_x$ amount versus speed diagram 1303 is obtained for the one-cylinder diesel engine burning the B15+W5 fuel sample; and $NO_x$ amount versus speed diagram 1304 is obtained for the one-cylinder diesel engine burning the B15+W5+CQD bio-nano emulsion fuel sample. Referring to FIG. 13, the results show that the addition of carbon quantum dot to the fuel composition reduces the $NO_x$ emission of the tested diesel engine by 25 to 41 percent at different engine speeds.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for synthesizing a bio-nano emulsion fuel composition, the method comprising:
    forming a water-in-fossil fuel emulsion by dispersing water into a fossil fuel in the presence of a surfactant;
    synthesizing carbon quantum dots with an average diameter between 0.5 nanometers and 20 nanometers, synthesizing carbon quantum dots comprising:
        forming a precursor suspension by dissolving a carbon precursor in water, the carbon precursor one of graphene, graphene oxide, carbon nanotubes, fullerene, carbon nano-fibers, active carbon, soot, organic acids, and combinations thereof; and
        forming carbon quantum dots by heating the precursor suspension at a temperature between 160° C. and 220° C.;
    carbonizing the carbon quantum dots at a temperature of at least 700° C. under an inert gas atmosphere;
    activating the carbonized carbon quantum dots by mixing the carbonized carbon quantum dots with an alkali metal hydroxide solution; and
    functionalizing the activated carbon quantum dots by passing nitric acid vapor with a temperature between 100° C. and 150° C. through a heated bed of the activated carbon quantum dots, the heated bed being heated at a temperature between 125° C. and 250° C.;
    forming a mixture of the synthesized carbon quantum dots and the water-in-fossil fuel emulsion by dispersing the synthesized carbon quantum dots into the water-in-fossil fuel emulsion, the carbon quantum dots comprising 1 ppm to 100 ppm of the mixture; and
    forming a bio-nano emulsion fuel composition by mixing a biofuel into the mixture of carbon quantum dots and the water-in-fossil fuel emulsion.

2. A method for synthesizing a bio-nano emulsion fuel composition, the method comprising:
    forming a water-in-fossil fuel emulsion by dispersing water into a fossil fuel in the presence of a surfactant;
    synthesizing carbon quantum dots with an average diameter between 0.5 nanometers and 20 nanometers;
    forming a mixture of the synthesized carbon quantum dots and the water-in-fossil fuel emulsion by dispersing the synthesized carbon quantum dots into the water-in-fossil fuel emulsion, the carbon quantum dots comprising 1 ppm to 100 ppm of the mixture; and
    forming a bio-nano emulsion fuel composition by mixing a biofuel into the mixture of carbon quantum dots and the water-in-fossil fuel emulsion.

3. The method according to claim 2, wherein synthesizing carbon quantum dots includes:
    forming a precursor suspension by dissolving a carbon precursor in water, the carbon precursor one of graphene, graphene oxide, carbon nanotubes, fullerene, carbon nano-fibers, active carbon, soot, organic acids, and combinations thereof; and
    forming carbon quantum dots by heating the precursor suspension at a temperature between 160° C. and 220° C.

4. The method according to claim 3, further comprising:
    carbonizing the carbon quantum dots at a temperature of at least 700° C. under an inert gas atmosphere;
    activating the carbonized carbon quantum dots by mixing the carbonized carbon quantum dots with an alkali metal hydroxide solution; and
    functionalizing the activated carbon quantum dots by passing nitric acid vapor with a temperature between 100° C. and 150° C. through a heated bed of the activated carbon quantum dots, the heated bed being heated at a temperature between 125° C. and 250° C.

5. The method according to claim 4, wherein carbonizing the carbon quantum dots at a temperature of at least 700° C. under an inert gas atmosphere includes heating the carbon quantum dots in a heating system at a temperature of at least 700° C. under an inert gas atmosphere for at least 1 hour.

6. The method according to claim 4, wherein activating the carbonized carbon quantum dots comprises:
    mixing the carbonized carbon quantum dots with an alkali metal hydroxide solution; and
    heating the mixture of the carbonized carbon quantum dots and the alkali metal hydroxide solution at a temperature of at least 800° C. for at least 1 hour.

7. The method according to claim 6, wherein mixing the carbonized carbon quantum dots with an alkali metal hydroxide solution includes mixing the carbonized carbon quantum dots with an alkali metal hydroxide solution with a (carbonized carbon quantum dots:alkali metal hydroxide solution) ratio between 1:1.5 and 2:3.

8. The method according to claim 4, wherein functionalizing the activated carbon quantum dots includes passing nitric acid vapor with a temperature between 100° C. and 150° C. through a heated bed of the activated carbon quantum dots for 2 to 24 hours.

9. The method according to claim 3, wherein forming carbon quantum dots by heating the precursor suspension includes forming carbon quantum dots by heating the precursor suspension at a temperature between 160° C. and 220° C. for at least 4 hours.

10. The method according to claim 3, wherein forming a precursor suspension by dissolving the carbon precursor in water comprises forming a precursor suspension by dissolving citric acid and urea in water.

11. The method according to claim 2, wherein forming a water-in-fossil fuel emulsion includes forming a water-in-fossil fuel emulsion by dispersing water into a fossil fuel in presence of a surfactant, the water comprising 0.01 to 50 vol % of the nano-emulsion fuel composition.

12. The method according to claim 2, wherein forming a nano-emulsion fuel composition by mixing a biofuel into the mixture of carbon quantum dots and the water-in-fossil fuel emulsion includes mixing the biofuel into the mixture of carbon quantum dots and the water-in-fossil fuel emulsion, the biofuel comprising 0 to 99 vol % of the nano-emulsion fuel composition.

* * * * *